(12) United States Patent
Zhao et al.

(10) Patent No.: US 7,423,089 B2
(45) Date of Patent: Sep. 9, 2008

(54) PREPARATION OF RUBBER COMPOSITION COMPRISED OF EPDM/POLYISOPRENE RUBBER BLENDS AND TIRE WITH SIDEWALL COMPRISED THEREOF

(75) Inventors: Junling Zhao, Hudson, OH (US); Aaron Scott Puhala, Kent, OH (US); Bina Patel Botts, Cuyahoga Falls, OH (US); Brad Stephen Gulas, Cleveland, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 227 days.

(21) Appl. No.: 11/249,866

(22) Filed: Oct. 13, 2005

(65) Prior Publication Data

US 2007/0088127 A1 Apr. 19, 2007

(51) Int. Cl.
*C08K 5/01* (2006.01)
*C08L 7/001* (2006.01)

(52) U.S. Cl. .................. 525/232; 525/236; 525/211; 525/240; 525/242; 524/497; 524/490; 524/491; 152/525

(58) Field of Classification Search .................. 525/232, 525/236, 211, 240, 242; 524/497, 490, 491; 152/524, 525
See application file for complete search history.

(56) References Cited

U.S. PATENT DOCUMENTS

| | | | |
|---|---|---|---|
| 4,003,420 A | 1/1977 | Sandstrom et al. | 152/355 |
| 4,645,793 A | 2/1987 | Von Hellens et al. | 524/518 |
| 4,801,641 A | 1/1989 | Ogawa et al. | 524/426 |
| 4,843,128 A | 6/1989 | Cesare | 525/193 |
| 4,973,627 A | 11/1990 | Mitchell | 525/211 |
| 5,386,865 A | 2/1995 | Sandstrom et al. | 152/525 |
| 5,504,136 A * | 4/1996 | Davis et al. | 524/490 |

FOREIGN PATENT DOCUMENTS

| | | |
|---|---|---|
| EP | 801106 | 10/1997 |
| EP | 1495857 | 1/2005 |

OTHER PUBLICATIONS

European Search Report, completed Nov. 29, 2006, for european patent application No. EP 06 121931.

* cited by examiner

*Primary Examiner*—Randy Gulakowski
*Assistant Examiner*—Olga Asinovsky
(74) *Attorney, Agent, or Firm*—Henry C. Young, Jr.

(57) ABSTRACT

This invention relates to preparation of rubber compositions comprised of EPDM and conjugated diene-based elastomer, particularly including cis 1,4-polyisoprene rubber, and particularly natural cis 1,4-polyisoprene rubber, blends and pneumatic rubber tire with an outer, visible sidewall layer of a rubber composition comprised of such rubber composition. For such preparation, a combination of at least two diverse EPDM elastomers is used together with a phase mixing process comprised of sequential phase mixing or parallel phase mixing in the sense of reinforcement filler and sulfur curatives.

1 Claim, No Drawings

US 7,423,089 B2

PREPARATION OF RUBBER COMPOSITION COMPRISED OF EPDM/POLYISOPRENE RUBBER BLENDS AND TIRE WITH SIDEWALL COMPRISED THEREOF

FIELD OF THE INVENTION

This invention relates to preparation of rubber compositions comprised of EPDM and conjugated diene-based elastomer, particularly including cis 1,4-polyisoprene rubber, and particularly natural cis 1,4-polyisoprene rubber, blends and pneumatic rubber tire with an outer, visible sidewall layer of a rubber composition comprised of such rubber composition. For such preparation, a combination of at least two diverse EPDM elastomers is used together with a phase mixing process comprised of sequential phase mixing or parallel phase mixing in the sense of reinforcement filler and sulfur curatives.

BACKGROUND OF THE INVENTION

Pneumatic rubber tires conventionally have outer rubber sidewall layers which may be subject to considerable flexing and scuffing as well as atmospheric aging.

In practice, such outer, atmospherically exposed, visible tire rubber sidewall outer layers may age somewhat prematurely as a result of, for example, weather aging due to atmospheric conditions, fatigue cracking due to continual flexing under operating conditions, and abrasion due to scuffing.

Aging of the rubber sidewall outer layer due to weathering may be, for example, a result of exposure to ultraviolet light, ozone and/or high humidity. Antidegradants are conventionally mixed with the sidewall rubber to counteract or retard such effects.

Fatigue cracking of the sidewall rubber outer layer, when it occurs, is usually due to continual flexing of the tire sidewall as the tire is run under load at service conditions, particularly if it has become atmospherically aged.

Use of a low unsaturation EPDM based rubber composition has been proposed for a tire outer sidewall outer layer to resist its aging because of the resistance of EPDM rubber to atmospheric (e.g. ozone) weathering because of its low unsaturation content. For example, see U.S. Pat. No. 5,386,865.

However, rubber compositions comprised of carbon black reinforced homogeneous EPDM/conjugated diene-based elastomer (e.g. natural cis 1,4-polyisoprene rubber) blends which contain a relatively high EPDM content may be expected to typically exhibit a reduction in tear strength, or resistance to tear and a reduction in adhesion (e.g. reduction in adhesion to itself and to adjoining tire components comprised of high unsaturation conjugated diene-based elastomers), as compared to a natural rubber based rubber composition, as well as a reduction in flex fatigue resistance.

Further, carbon black reinforcement of an EPDM/conjugated diene-based elastomer (e.g. natural cis 1,4-polyisoprene rubber) blend is considered herein to be a challenge in a sense of the carbon black reinforcement being more compatible with the conjugated diene-based elastomer (e.g. natural rubber) then the EPDM rubber and thereby contained in a greater proportional amount and presenting a greater carbon black reinforcement capability in the natural rubber portion as compared to the EPDM portion.

A further challenge is presented in the sulfur curing of an EPDM/conjugated diene-based elastomer (e.g. natural rubber) blend in a sense of sulfur and sulfur vulcanization accelerators being typically more soluble in the conjugated diene-based elastomer (e.g. natural rubber) portion than the EPDM portion of the rubber composition and thereby contained in greater proportion in the conjugated diene-based elastomer (e.g. natural rubber) portion of the rubber composition. Such challenge is amplified in a sense of the EPDM containing significantly less unsaturation and therefore presenting a lesser sulfur crosslinked content.

Further, the sulfur cure rate, or sulfur vulcanization rate, of the EPDM/conjugated diene-based elastomer (e.g. natural rubber) blend is considered herein to be a challenge in a sense of the sulfur cure rate of the lower unsaturation EPDM rubber being significantly slower than the cure rate of the high unsaturation conjugated diene-based elastomer (e.g. natural rubber).

In addition, such EPDM/conjugated diene-based elastomer (e.g. natural rubber) based outer rubber sidewall layer may present significant sulfur cure rate compatibility challenges with adjoining tire components composed of a more normally faster sulfur curing high unsaturation conjugated diene-based rubber compositions.

Accordingly, in one aspect, sulfur curatives (e.g. sulfur vulcanization accelerators) may be considered for use in this invention:

(A) which have a greater solubility in the EPDM rubber than the high unsaturation conjugated diene-based elastomer (e.g. cis 1,4-polyisoprene rubber) to minimize diffusion of the sulfur curative(s) from the low unsaturation EPDM rubber into the high unsaturation conjugated diene-based rubber, such as for example, zinc octadecylisopropyldithiocarbamate, or (B) which have a relatively high molecular weight to minimize diffusion of the sulfur curative(s) from the low unsaturation EPDM rubber into the high unsaturation conjugated diene-based rubber, or (C) to bond with the EPDM rubber to minimize their migration to the high unsaturation conjugated diene-based elastomer phase of the rubber composition.

In practice, for this invention, it is proposed to phase mix a rubber composition comprised of EPDM and conjugated diene-based elastomers, particularly such elastomers which comprise cis 1,4-polyisoprene rubber and more particularly natural cis 1,4-polyisoprene rubber, with rubber reinforcing filler, such as for example rubber reinforcing carbon black, and with sulfur curatives.

In one aspect, such phase mixing is comprised of a sequential phase mixing of rubber reinforcing carbon black with an EPDM-rich rubber composition followed by mixing a conjugated diene-based elastomer (e.g. cis 1,4-polyisoprene rubber) therewith in order that the rubber reinforcing carbon black preferentially associates itself first and thereby primarily with the EPDM rubber before the conjugated diene-based elastomer (e.g. cis 1,4-polyisoprene rubber) is added.

By such sequential phase mixing process, the rubber reinforcing carbon black remains primarily associated with the EPDM rubber in the EPDM/conjugated diene-based elastomer (e.g. cis 1,4-polyisoprene rubber) composition and therefore promotes an enhancement of the overall carbon black reinforcement of the rubber composition as compared to a more simple homogeneous mixing of the EPDM rubber and conjugated diene-based rubber such as a cis 1,4-polyisoprene rubber and particularly natural cis 1,4-polyisoprene rubber.

In another aspect, such phase mixing is comprised of a parallel phase mixing of individual phase mixed rubber composition (which might be sometimes referred to as "Y-mixing") in which a first rubber composition is prepared by blending the EPDM rubber with a majority of the rubber reinforcing carbon black together with which a majority, and perhaps all, of the sulfur curatives comprised of sulfur and organic sulfur vulcanization accelerator(s) and a second rubber composition is prepared by blending the conjugated diene-based rubber(s), such as for example the cis 1,4-polyisoprene rubber, (particularly natural rubber) with a minor amount of the rubber reinforcing carbon black and a minor amount, if any, of said sulfur curatives, followed by blending said first and second rubber compositions together in order that said sulfur curatives and a major portion of said rubber reinforcing carbon black associates themselves first, and thereby primarily with, the EPDM rubber in order to both minimize sulfur cure rate incompatibilities between the EPDM rubber portion and the conjugated diene rubber portion of the rubber composition and to maximize the carbon black reinforcement of the overall rubber composition.

For the purposes of this invention is the EPDM rubber is composed of at least two EPDM elastomers which are differentiated from each other.

For such purpose, a first EPDM elastomer is provided which is more elastomeric in nature by containing a higher non-conjugated diene content and thereby promotes a more rapid rate of sulfur curing, insofar as the EPDM elastomer is concerned, to aid in reducing the sulfur rate incompatibility between the EPDM rubber and conjugated diene-based elastomer(s), such as for example the natural cis 1,4-polyisoprene rubber.

For such purpose, second EPDM elastomer is provided which is less elastomeric in nature than the first EPDM elastomer by having a lower non-conjugated diene content. Its somewhat higher ethylene content (e.g. a higher ethylene/propylene ratio) may present the second EPDM elastomer as being somewhat being somewhat more self-reinforcing than the first EPDM elastomer in circumstances where it contains polyethylene-based crystalline domains at its higher ethylene content levels.

The use of the dual EPDM elastomer blend, then, is intended to promote mechanical strength and interfacial strength between the EPDM rubbers and conjugated diene-based rubbers, particularly the conjugated-diene based rubbers comprised of cis 1,4-polyisoprene rubber, particularly natural cis 1,4-polyisoprene rubber.

In practice, the non-conjugated diene for the EPDM terpolymer rubber may be selected from, or comprised of, for example, ethylidene norbornadiene, dicyclopentadiene or trans 1,4-hexadiene, with ethylidene norbornadiene being often preferred. Such EPDM terpolymer rubbers, in general, are well known to those having skill in such art.

In the description of this invention, the term "phr" relates to parts by weight of an ingredient per 100 parts by weight of rubber.

The terms "rubber" and "elastomer", "cure" and "vulcanize", and "compound" and "composition" may be used interchangeably unless otherwise indicated.

DISCLOSURE AND PRACTICE OF THE INVENTION

In accordance with this invention, a process of preparing a rubber composition (particularly for a tire sidewall outer layer) comprises phase mixing elastomers comprised of EPDM rubber and at least one conjugated diene-based elastomer including cis 1,4-polyisoprene rubber, and rubber reinforcing particulate filler.

Accordingly, a process of preparing a rubber composition which comprises, based upon parts by weight per 100 parts rubber (phr):

(A) sequential phase mixing a rubber composition by:
   (1) providing a first rubber composition comprised of EPDM rubber containing a dispersion of a particulate filler reinforcement therein, followed by:
   (2) forming a second rubber composition by blending said first rubber composition with at least one conjugated diene-based rubber wherein said conjugated diene-based rubber includes a cis 1,4-polyisoprene rubber, followed by:
   (3) blending sulfur curative comprised of elemental sulfur with said second rubber composition, or (B) parallel phase mixing a rubber composition by:
   (1) forming a first rubber composition by blending EPDM rubber, particulate rubber reinforcing filler and sulfur curative comprised of elemental sulfur;
   (2) forming a second rubber composition by blending at least one conjugated diene-based elastomer wherein said conjugated diene-based elastomer includes a cis 1,4-polyisoprene rubber, followed by
   (3) blending said first rubber composition with said second rubber composition;

wherein said EPDM rubber is provided as a combination of:
   (a) a first EPDM rubber as an ethylene/propylene/non-conjugated diene terpolymer having an ethylene/propylene ratio in a range of from about 35/65 up to 65/35, and having an ethylene content of from 35 up to 65 weight percent, and a non-conjugated diene content in a range of about 4 to about 12 weight percent, and
   (b) a second EPDM elastomer as an ethylene/propylene/non-conjugated diene terpolymer having an ethylene/propylene ratio in a range of from at least 65/35 to about 85/15, and having an ethylene content in a range of from greater than 65 and up to about 85 weight percent, and a non-conjugated diene content in a range of about 2 to about 8 weight percent, and wherein said particulate reinforcing filler is comprised of at least one of rubber reinforcing carbon black, precipitated silica and exfoliated clay platelets, and their mixtures.

In practice, said particulate reinforcing filler is preferably from about 30 to about 70 phr of rubber reinforcing filler comprised of:

(A) rubber reinforcing carbon black;

(B) about 20 to about 60 phr of rubber reinforcing carbon black and about 10 to about 50 phr of precipitated silica (amorphous, synthetic silica aggregates); or (C) about 2 to about 20 phr of exfoliated clay platelets and about 28 to about 60 of at least one of rubber reinforcing carbon black and precipitated silica, preferably rubber reinforcing carbon black.

Examples of rubber reinforcing carbon black may be found, for example, in *The Vanderbilt Rubber Handbook*, 1978 edition, Page 417.

Various commercially-available precipitated silicas may be considered for use in the tread of this invention, such as for example only and without limitation, silica from Rhodia such as, for example, Zeosil 1165MP™, silica from Degussa A G with designations such as, for example, VN3™, and silica from J. M. Huber such as, for example, Hubersil 4155™ and silica from PPG Industries such as, for example, HiSil 210™.

In practice, a coupling agent is normally used with the precipitated silica filler to enhance its reinforcing effect for the elastomers as is well known to those having skill in such art. Such coupling agent contains a moiety reactive with hydroxyl groups (e.g. silanol groups) contained on the precipitated silica and another different moiety active with unsaturated (e.g. carbon-to-carbon double bond unsaturation). contained in said EPDM elastomers and said conjugated diene-based elastomer(s).

In practice, for said sequential phase mixing process, said first rubber composition is comprised of said EPDM rubber to a substantial exclusion of said conjugated diene-based rubber (e.g. less than 10 phr of conjugated diene-based elastomer).

In practice, for said parallel phase mixing process, from about 80 to about 100 percent of said rubber reinforcing filler is blended with and contained in said first rubber composition and from zero to about 20 percent of said rubber reinforcing filler is blended with and contained in said second rubber composition.

In practice, for said parallel phase mixing process, said first rubber composition is mixed with said EPDM to a substantial exclusion of said conjugated diene-based rubber (e.g. less than about 10 phr of said conjugated diene-based rubber).

In practice, for said parallel phase mixing process, said second rubber composition is mixed with said at least one conjugated diene-based rubber to the substantial exclusion of said EPDM rubber (e.g. less than about 10 phr of said EPDM rubber), to form a second rubber composition.

In practice, said sulfur curative for said parallel phase mixing process is comprised of said elemental sulfur and at least one organic sulfur vulcanization accelerator, activator (e.g. zinc oxide and/or, fatty acid) and, optionally, vulcanization retarder. Such sulfur vulcanization accelerators and retarders are well known to those having skill in such art.

Preferably the weight ratio of said first EPDM to said second EPDM is in a range of from about 10/90 to about 90/10, alternately from about 40/60 to about 80/20.

A significant aspect of the invention insofar as said phase mixed rubber composition is the providing of a rubber composition comprised of EPDM rubber and conjugated diene based rubber in which:

(A) for the sequential and parallel phase mixing processes of this invention, the EPDM rubber phase contains the major portion of the particulate filler reinforcement (e.g. rubber reinforcing carbon black, precipitated silica, exfoliated clay platelets or mixtures of two or more of such particulate filler reinforcement), and (B) for the parallel phase mixing process of this invention, the EPDM rubber phase contains the major portion of filler reinforcement as well as a major portion of sulfur vulcanization curative(s).

A significant aspect of the sequential phase mixed rubber composition is considered herein to be the presence of the filler reinforced EPDM rubber phase which in turn is considered herein to be significant in the sense of promoting improvement of physical properties of the EPDM phase, such as for example its stiffness, in order to promote one or more beneficial physical properties of the rubber composition itself such as, for example, dynamic fatigue resistance, tear strength, ultimate tensile strength, ultimate elongation, and hysteresis for the tire sidewall outer (atmospherically exposed) layer.

A significant aspect of the parallel phase mixed (Y-mixed) rubber composition is considered herein, in addition to said promoting of one or more physical properties according to said sequential phase mixing process, to be promoting an increased sulfur cure rate to enhance computability with cure rates of a higher unsaturated conjugated diene-based rubber as well as promoting one or more physical properties such as, for example, tear strength and adhesion between adjoining tire component(s), namely tire sidewall plies, comprised of at least one conjugated diene-based elastomer as well to itself.

A significant aspect of the invention insofar as using, in the blend of EPDM rubbers, a relatively elastomeric EPDM rubber having a relatively high non-conjugated diene content (ultra high molecular weight and relatively narrow molecular weight distribution) to promote sulfur cure rate compatibility and interface strength between the EPDM and conjugated diene-based elastomer phases of the rubber composition and wherein its ultra high molecular weight is considered herein to promote a higher crosslink network within the rubber composition to further promote physical rubber properties.

A significant aspect of the invention insofar as using, in the blend of EPDM rubbers, a semi-crystalline EPDM rubber as a relatively self reinforcing elastomer is considered herein to improve the mechanical strength of the EPDM phase of the rubber composition.

Representative of said non-conjugated diene for said EPDM are, for example, ethylidene norbornene, dicyclopentadiene and trans 1,4-hexadiene.

In further accordance with this invention, a rubber composition is provided as being prepared by said sequential phase mix process.

In additional accordance with this invention, a rubber composition is provided as being prepared by said parallel phase mix process (Y-mix process).

In further accordance with this invention, a pneumatic rubber tire is provided having a outer (visible) rubber sidewall layer wherein said outer sidewall layer is a sulfur cured rubber layer composition comprised of said sequential phase mixed rubber composition, or said parallel phase mixed rubber composition.

Representative of said first EPDM rubber is a commercially available elastomer such as for example BUNA EP T 4969™ from the Lanxess Company understood to have an ethylene/propylene ratio of about 62/28, namely an ethylene content (units derived from ethylene) of about 62 percent, and a non-conjugated diene content of about 10 percent, wherein said non-conjugated diene is ethylidene norbornene.

Representative of said second EPDM rubber is a commercially available elastomer such as for example BUNA EP T 6470™ from the Lanxess Company which is understood to understood to have an ethylene/propylene ratio of about 68/27, namely an ethylene content (units derived from ethylene) of about 68 percent, and a non-conjugated diene content of about 5 percent, wherein said non-conjugated diene is ethylidene norbornene.

It is important to appreciate that significant differences between the two EPDMs are the ethylene contents, with the difference between 62 and 68 percent being sufficiently different in the sense of promoting a greater crystalline content for the respective EPDM, and the non-conjugated diene content of 10 percent being sufficient to promote greater elastomeric properties for the respective EPDM.

Therefore the BUNA EP T 4969 EPDM has a significantly less ethylene content (62 percent) and significantly greater non-conjugated diene content (10 percent) and would therefore be expected to be more elastomeric in nature.

Therefore the BUNA EP T 6470 EPDM has a significantly greater ethylene content (68 percent) to promote a greater crystalline content, and significantly less non-conjugated diene content (5 percent) and would therefore be expected to be less elastomeric in nature.

For the purposes of this description, said sequential phased mixed rubber composition and said parallel phase mixed (Y-mixed) rubber composition represent rubber compositions which have been compounded with appropriate compounding ingredients such as, for example, said carbon black, oil, stearic acid, zinc oxide, silica if used, wax, antidegradants, resin(s) and curatives as sulfur and at least one sulfur vulcanization accelerator.

It is readily understood by those having skill in the art that the rubber compositions of the sidewall would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, the indicated rubber reinforcing carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise, for example, about 0.5 to about 10 phr, usually about 1 to about 5 phr. Typical amounts of processing aids may comprise, for example, from about 1 to 20 phr. Such processing aids can include, for example, aromatic, naphthenic, and/or paraffinic processing oils. Silica, (e.g. precipitated silica) if used, might be used in an amount of, for example, about 5 to about 25 phr, often with a silica coupling agent. Typical amounts of antioxidants comprise, for example, about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants may comprise, for Example 1 about 1 to about 5 phr. Typical amounts of fatty acids, if used, which can include stearic acid comprise, for example, about 0.5 to about 3 phr. Typical amounts of zinc oxide comprise, for example, about 2 to about 6 phr. Typical amounts of waxes, if used, comprise, for example, about 1 to about 5 phr. Often microcrystalline waxes are used. Typical amounts of peptizers, if used, may comprise, for example, about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging, for example, from about 0.5 to about 4 phr, with a range of from about 0.5 to about 2.25 sometimes being preferred.

Vulcanization accelerator(s) are used to control the time and/or temperature required for vulcanization and to improve the properties of the vulcanizate. In one embodiment, a single accelerator system may be used, i.e., primary accelerator. Conventionally, a primary accelerator is used in amounts ranging, for example, from about 0.5 to about 2.0 phr. In another embodiment, combinations of two or more accelerators which the primary accelerator may generally used in the larger amount, for example from about 0.5 to about 2 phr, and a secondary accelerator which is generally used in smaller amounts of, for example, from about 0.05 to about 0.50 phr in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention unless otherwise indicated.

Sometimes a combination of antioxidants, antiozonants and waxes may be collectively referred to as antidegradants.

The tire can be built, shaped, molded to include said outer sidewall rubber layer and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Evaluation of Sequential Phase Mixing Process

EPDM/natural rubber based rubber compositions were prepared to evaluate the feasibility of preparing a rubber sidewall composition by a sequential phase mixing process for blending a combination of significantly different EPDM elastomers together with natural cis 1,4-polybutadiene rubber and reinforcing filler as a rubber reinforcing carbon black.

The rubber samples are referred to herein as Control Sample A and Phase Mixed Sample B.

The Control Sample A was prepared by a process of simply homogeneously mixing two different EPDM rubbers, natural rubber and rubber reinforcing carbon black together in an internal rubber mixture in a non-productive mixing stage (without the sulfur curatives) to a temperature of about 160° C. Thereafter, the rubber mixture is mixed in a productive mixing stage in an internal rubber mixer to a temperature of about 110° C. in which the sulfur curatives, including elemental sulfur, were mixed.

The rubber composition is cooled to below 40° C. after each of the mixing stages.

Phase Mixed Sample B was prepared by a sequential phase mixing process in which 100 weight percent of the rubber reinforcing carbon black is mixed with the EPDM rubbers in a first non-productive mixing step (NP1) in an internal rubber mixer to form a carbon black reinforced EPDM phase to a temperature of about 160° C.

The rubber mixture was dumped from the rubber mixer, sheeted out and allowed to cool to below 40° C.

In a second non-productive mixing step (NP2), the rubber mixture (from NP1) was mixed with the remaining rubber reinforcing carbon black and natural cis 1,4-polyisoprene rubber in an internal rubber mixer to a temperature of about 160° C.

The rubber mixture was dumped from the rubber mixer, sheeted out and allowed to cool to below 40° C.

In a subsequent, sequential productive mixing step (P), sulfur curative including elemental sulfur and vulcanization accelerator are blended with the sequential phase-mixed rubber composition in an internal rubber mixer to temperature of about 110° C. and the phase mixed rubber mixture with curatives dumped from the mixer and allowed to cool to below 40° C.

For the resulting sequentially phase mixed rubber composition of Sample B, most of the carbon black reinforcement is therefore associated with the EPDM rubber phase and a lesser portion of the carbon black reinforcement is associated with the natural cis 1,4-polyisoprene rubber phase instead of the carbon black being mostly distributed in the cis 1,4-polyisoprene rubber phase by homogeneously mixing as in the process of preparing Control Rubber Sample A. This is the essence of a sequential phase mixing process for blending a rubber reinforcing carbon black with at least two elastomers.

Materials for the rubber Samples are illustrated in the following Table 1.

TABLE 1

|  | Homogeneously Mixed Control Sample A | Sequential Phase Mixed Sample B |
|---|---|---|
| Non Productive Mixing Step (NP1) |  |  |
| First EPDM rubber[1] | 72 | 72 |
| Second EPDM rubber[2] | 24 | 24 |
| Cis 1,4-polyisoprene rubber[3] | 40 | 0 |
| Carbon black[4] | 50 | 50 |
| Tackifier resin[5] | 3 | 3 |
| Fatty acid[6] | 2 | 2 |
| Non Productive Mixing Step (NP2) for Sample B |  |  |
| Cis 1,4-polyisoprene rubber[3] |  | 40 |
| Productive Mixing Step (P) |  |  |
| Zinc oxide | 5 | 5 |
| Sulfur | 1.8 | 1.8 |
| Accelerator[7] | 2.2 | 2.2 |

[1]EPDM rubber as BUNA EP T 4969 from Lanxess Company as a terpolymer comprised of (units derived from) about 62 weight percent ethylene, 28.2 weight percent propylene and about 9.8 weight percent ethylidene norbonrene (ENB). The EPDM is oil extended by containing 50 weight percent rubber processing oil but is reported in Table 1 based on the composite of EPDM and oil.
[2]EPDM rubber as BUNA EP T 6470 from Lanxess Company as a terpolymer comprised of (units derived from) about 68 weight percent ethylene, 27.5 weight percent propylene and about 4.5 weight percent ethylidene norbomadiene
[3]Cis 1,4-polyisoprene natural rubber (SMR-20)
[4]Carbon black as N550, an ASTM designation
[5]Tackifier resin as a phenol resin
[6]Fatty acid as an industrial stearic acid comprised of stearic, palmitic and oleic acids
[7]Sulfur vulcanization accelerator of the sulfenamide type Various physical properties are shown in the following Table 2. Where appropriate, the Samples were cured for about 12 minutes at a temperature of about 170° C.

TABLE 2

|  | Control Sample A | Sequential Phase Mixed Sample B |
|---|---|---|
| (ATS)[1] |  |  |
| Tensile strength (MPa) | 12.96 | 15.24 |
| Elongation at break (%) | 548 | 597 |
| 300% modulus, ring (MPa) | 5.96 | 6.18 |
| Hardness, Shore A |  |  |
| 23° C. | 57.2 | 55.4 |
| 100° C. | 49.8 | 48.9 |
| Rebound |  |  |
| 23° C. | 59 | 61.4 |
| 100° C. | 62.6 | 64.2 |
| Cyclic (dynamic) Flex fatigue test[2] (average cycles to break for 6 specimens or a million cycles if specimen doesn't break) | 398,912 | 817,873 |
| Goodrich blowout test[3] |  |  |
| Time (minutes) | 25 | 45 |
| Temperature (° C.) | 152 | 154 |
| Tear strength (to self). 95° C. |  |  |
| Steady state average load (Newtons)[4] | 19.5 | 105 |
| RPA. 100° C. 1 Hertz[5] |  |  |
| Storage modulus G', 1% strain (MPa) | 1.06 | 0.834 |
| Storage modulus G', 15% strain (MPa) | 0.683 | 0.679 |
| Storage modulus G', 50% strain (MPa) | 0.509 | 0.545 |
| Tan delta, 10% strain | 0.177 | 0.117 |

[1]Data obtained according to Automated Testing System (ATS) instrument by the Instron Corporation which incorporates six tests in one system. Such instrument may determine ultimate tensile, ultimate elongation, modulii, etc. Data reported in the Table 2 is generated by running the ring tensile test station which is an Instron 4201 load frame.
[2]ASTM D4482
[3]ASTM D 623
[4]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of therubber compositions being pulled apart at a 180° angle to each other using an Instron instrument.
[5]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.

From Table 2 it can be seen that, for the cyclic (dynamic) flex fatigue test for Sample B, the average cycles to failure was significantly greater than the average cycles to failure for Control A. This is considered herein to be a result of better carbon black reinforcement of the EPDM portion of the rubber composition (better carbon black dispersion in the EPDM portion) as a result of the sequential phase mixing which resulted in an improved overall resistance to dynamic flex failure of rubber Sample B of an average of 817,873 cycles as compared to 398,912 cycles for rubber Control A which more than doubled the fatigue life.

From Table 2 it can also be seen that static average load from the tear strength test for the rubber Sample B (105 Newtons) was significantly higher than that of the rubber Control A (19.5 Newtons). This is also considered herein to be a result of better carbon black reinforcement of the EPDM portion of the rubber composition (better carbon black dispersion in the EPDM portion) as a result of the sequential phase mixing.

From Table 2 it can further be seen that the blow out time from Goodrich blow out test for the rubber Sample B (45 minutes) was significantly longer than that of the control A (25 minutes). This is further considered herein to be a result of better carbon black reinforcement of the EPDM portion of the rubber composition (better carbon black dispersion in the EPDM portion) as a result of the sequential phase mixing.

From Table 2 it can additionally be seen that not only improved tensile strength (15.2 MPa) but also elongation at break (597 percent) for the rubber Sample B compared to the rubber Control A (13 MPa and 548 percent). This is additionally considered herein to be a result of better carbon black reinforcement of the EPDM portion of the rubber composition (better carbon black dispersion in the EPDM portion) as a result of the sequential phase mixing.

Therefore, mechanical strength, in general, for the rubber Sample B was significantly greater that the mechanical strength of rubber Control A.

Such improved results of the dynamic flex fatigue test, the tear strength test, the Goodrich blow out test, and the ATS test are considered herein to be significant in a sense that they are indications of an extended fatigue life and dynamic strength of an outer tire sidewall layer based upon rubber Sample B.

EXAMPLE II

Further Evaluation of Phase Mixing

EPDM/natural rubber based rubber compositions were prepared to evaluate the feasibility of preparing a rubber sidewall composition by a phase mixing process for blending a combination of significantly different EPDM elastomers together with natural cis 1,4-polybutadiene rubber and reinforcing filler as a rubber reinforcing carbon black.

The Evaluation used a Sequential Phase Mixing Process and a Parallel Phase Mixing Process (Y-Mixing Process).

The rubber samples are referred to herein as homogeneously mixed Control Sample A (used in Example I), Sequentially Phase Mixed Sample C and Parallel Phase Mixed Sample D.

Sequential Phase Mixed Sample C was prepared in a manner similar to Sample B of Example I except that the ratio of EPDM to natural rubber has been modified and the carbon black loading has also been modified. The sequential phase mixing was carried out in an internal rubber mixer. In the first non productive mixing step (NP-1) the reinforcing filler (rubber reinforcing carbon black) was mixed with the EPDM rubbers to form a first rubber phase and the resulting rubber composition dumped from the mixer, sheeted out and allowed to cool to below 40° C. In a second non productive mixing in an internal rubber mixer (NP-2) natural cis 1,4-polyisoprene rubber was blended with the first rubber phase rubber composition and the resulting rubber mixture dumped from the mixer, sheeted out and allowed to cool to below 40° C. In a subsequent productive mixing state (P), the sulfur curatives were mixed therewith.

Parallel Phase Mixed (Y-Mixed) Sample D was prepared in an internal rubber mixer.

In particular, a first rubber composition was prepared by mixing EPDM rubbers and 40 phr rubber reinforcing carbon black in a first non productive mixing step (NP-1) and the mixture dumped from the mixer and allowed to cool to below 40° C.

In a first productive mixing step (PR-1) sulfur curatives were mixed with the rubber mixture from the non productive mixed rubber composition from (NP-1).

In a separate non productive mixing step (NP-2) a second rubber mixture is prepared by mixing 10 phr of rubber reinforcing carbon black and natural cis 1,4-polyisoprene rubber.

Then, in a second productive mixing step (PR-2) the two individual rubber compositions from PR-1 and NP-2 were mixed together in an internal rubber mixer.

For the resulting Sequentially Phase Mixed rubber composition of Sample C, most of the carbon black reinforcement is therefore associated with the EPDM rubber phase and a lesser portion of the carbon black reinforcement is associated with the natural cis 1,4-polyisoprene rubber phase instead of the carbon black being mostly distributed in the cis 1,4-polyisoprene rubber phase by homogeneously mixing as in the process of preparing Control Rubber Sample A. This is the essence of a phase mixing process for blending a rubber reinforcing carbon black with at least two elastomers.

For the resulting Parallel Phase Mixed (Y-Mixed) rubber composition Sample D, addition to the Sequential Phase Mixed Sample C, the sulfur curatives were mixed in the filler (rubber reinforcing carbon black) reinforced EPDM rubbers and combined with a pre-mixed natural cis 1,4-polyisoprene rubber and rubber reinforced carbon black. In such manner, the sulfur curatives are considered herein to be preferentially primarily bound, or associated with, the filler reinforced EPDM rubber phase of the rubber mixture to reduce curing rate incompatibility between the EPDM and natural rubber phases.

The rubber compositions were dumped from the respective internal rubber mixer, sheeted out and cooled to below 40° C. between mixing steps.

Materials for the rubber Samples are illustrated in the following Table 3.

TABLE 3

| | Homogeneous Mixed Control A | Sequential Phase Mixed C | Y-Phase Mixed D |
|---|---|---|---|
| Non Productive Mixing Steps | | | |
| Non Productive Mixing Step (NP1) | | | |
| First EPDM rubber[1] | 72 | 60 | 60 |
| Second EPDM rubber[2] | 24 | 20 | 20 |
| Cis 1,4-polyisoprene rubber[3] | 40 | 0 | 0 |
| Carbon black[4] | 50 | 41.7 | 40 |
| Rubber plasticizers[5] | 0 | 3 | 3 |
| Tackifier resin[6] | 3 | 3 | 3 |
| Fatty acid[7] | 2 | 2 | 2 |
| Non Productive Sequential Phase Mixing Step (NP2) for Sample C | | | |
| Batch (rubber composition) from NP1 | — | 129.7 | — |
| Cis 1,4-polyisoprene rubber[3] | — | 50 | — |
| Carbon black[4] | — | 8.3 | — |
| Antioxidant[8] | — | 2 | — |
| Non Productive Parallel Phase Mixing Step (NP3) for Sample D | | | |
| Cis 1,4-polyisoprene rubber[3] | — | — | 50 |
| Carbon black[4] | — | — | 10 |
| Antioxidant[8] | — | — | 2 |
| Productive Mixing Steps (Sulfur Addition) | | | |
| Productive Mixing Step (PR1) for Sample A and for Sample C | | | |
| Batch (rubber composition) from NP1 | 191 | 0 | — |
| Batch (rubber composition) from NP2 | 0 | 190 | — |
| Zinc oxide | 5 | 5 | — |
| Sulfur | 1.8 | 1.5 | — |
| Accelerator(s)[9] | 2.2 | 1.9 | — |
| Productive Parallel Phase Mixing Step (PR2) for Sample D | | | |
| Batch (rubber composition) from NP-1 | — | — | 128 |
| Zinc oxide (as a vulcanization activator) | — | — | 5 |
| Sulfur | — | — | 1.5 |
| Accelerator(s)[9] | — | — | 1.9 |
| Productive Parallel Phase Mixing Step (PR3) for Sample D | | | |
| NP-3 (Batch rubber composition from NP-3) | — | — | 62.0 |
| PR-2 (Batch rubber composition from PR-2) | — | — | 136.4 |

[1]EPDM rubber as BUNA EP T 4969 from Lanxess
[2]EPDM rubber as BUNA EP T 6470 from Lanxess
[3]Cis 1,4-polyisoprene natural rubber (SMR-20)
[4]Carbon black as N550, an ASTM designation
[5]Rubber plasticizers as aromatic/paraffinic oil
[6]Tackifier resin as a phenol resin
[7]Fatty acid as an industrial stearic acid comprised of stearic, palmitic and oleic acids
[8]Antioxidant as a non-staining antioxidant
[9]Sulfur vulcanization accelerators of the sulfenamide and thiazole types Various physical properties are shown in the following Table 4. Where appropriate, the Samples were cured for about 12 minutes at a temperature of about 170° C.

TABLE 4

|  | Homogeneous Mixed Control A | Sequential Phase Mixed C | Y-Phase Mixed D |
|---|---|---|---|
| Original (ATS)[1] | | | |
| Tensile strength (MPa) | 12.96 | 15.2 | 15.3 |
| Elongation at break (%) | 548 | 651 | 690 |
| 300% modulus, ring (MPa) | 5.96 | 5.06 | 4.25 |
| Hardness. Shore A | | | |
| 23° C. | 57.2 | 52.4 | 49.3 |
| 100° C. | 49.8 | 44.1 | 43.2 |
| Rebound | | | |
| 23° C. | 59 | 57.8 | 59.1 |
| 100° C. | 62.6 | 59.4 | 60.6 |
| Cyclic dynamic flex fatigue test[2] (Average cycles to break for 6 specimen samples) | 398,912 | 934,046 | 860,549 |
| DeMattia Cut-Growth Resistance with Wedge Piece[3] | | | |
| Crack length at 240 min at 23° C. (millimeters) | 9.07 | 4.93 | 5.40 |
| DIN Abrasion Value[4] | | | |
| Relative volume loss, cc | 156 | 153 | 155 |
| Dynamic Ozone Test (0 to 60% strain, 50 pphm and 40° C. for 48 hours)[5] | None | None | None |
| Tear Strength. Adhesion to Self, 95° C. (Newtons)[6] | | | |
| Original, unaged | 19.5 | 138 | 193 |
| Aged, 70° C., 7days | 33.5 | 110 | 154 |

[1]Data obtained according to Automated Testing System (ATS) instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[2]ASTM D4482
[3]ASTM D813
[4]Data obtained according to DIN 53516 abrasion resistance test procedure using a Zwick drum abrasion unit, Model 6102 with 2.5 Newtons force. DIN standards are German test standards. The DIN abrasion results are reported as relative values to a control rubber composition used by the laboratory.
[5]STM D3395
[6]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.

From Table 4 it can be seen that for the cyclic (dynamic) flex fatigue test, the average cycles to failure for Sequential Phased mixed rubber Sample C, (934,046 cycles), and for Parallel Phase Mixed rubber Sample D (860,649 cycles) was significantly greater than the average cycles to failure for Homogeneously Mixed rubber Control A (398,912 cycles). Indeed, the dynamic fatigue life for rubber Sample C and for rubber Sample D was more than double the dynamic fatigue life for rubber Control A. This is considered herein to be a result of better carbon black reinforcement of the EPDM portion of the rubber composition (better carbon black dispersion in the EPDM portion) as a result of the sequential phase mixing and parallel phase mixing which resulted in an improved overall resistance to dynamic flex failure of rubber Sample C and rubber Sample D, respectively.

From Table 4 it can further be seen that the crack propagation length for 240 minutes at 23° C. from the DeMattia cut-growth test for sequential phase mixed rubber Sample C (only 4.93 millimeters) and parallel phase mixed rubber Sample D (only 5.4 millimeters) was significantly less than that of the homogeneously mixed rubber Control A (9.1 millimeters). This is considered herein to be a result of better carbon black reinforcement of the EPDM portion of the rubber composition (better carbon black dispersion in the EPDM portion) as a result of the sequential phase mixing for rubber Sample C and as a result of the parallel phase mixing for rubber Sample D.

From Table 4 it can also be seen that both original and aged static average loads from the tear strength test for the sequential phase mixed rubber Sample C (138 and 110 Newtons) and the parallel phase mixed rubber Sample D (193 and 154 Newtons) were significantly higher than that of the homogeneously mixed rubber Control A (19.5 and 33.5 Newtons). This is also considered herein to be a result of better carbon black reinforcement of the EPDM portion of the rubber composition (better carbon black dispersion in the EPDM portion) as a result of the sequential phase mixing and parallel phase mixing, respectively.

From Table 4 it can additionally be seen that not only improved tensile strength but also elongation at break from the ATS test for both the sequential phase mixed rubber Sample C (15.2 MPa and 651 percent) and the parallel phase mixed rubber Sample D (15.3 MPa and 690 percent) compared to homogeneously mixed rubber Control A (13 MPa and 548 percent). This is additionally considered herein to be a result of better carbon black reinforcement of the EPDM portion of the rubber composition (better carbon black dispersion in the EPDM portion) as a result of the sequential phase mixing and parallel mixing, respectively.

These physical results are considered herein to be significant because the mechanical strength for both the resulting compositions of the rubber Sample C and the rubber Sample D were much stronger than that of the rubber Control A.

These results from the dynamic flex fatigue test, the DeMattia cut-growth test, the tear strength test, the ATS test are considered herein to be significant in a sense that they are indications of an extended fatigue life and dynamic strength of an outer tire sidewall composition comprised of the prepared rubber Sample C and the prepared rubber Sample D, respectively.

While certain representative embodiments and details have been shown for the purpose of illustrating the invention, it will be apparent to those skilled in this art that various changes and modifications may be made therein without departing from the spirit or scope of the invention.

What is claimed is:

1. A tire having an outer visible sidewall layer of a sulfur cured rubber composition comprised of a parallel phase mixed rubber composition;
   wherein said parallel phased mixed rubber composition is prepared by a process which comprises:
   (A) forming a first rubber composition by blending EPDM rubber, particulate rubber reinforcing filler and sulfur curative comprised of elemental sulfur;
   (B) forming a second rubber composition comprised of at least one conjugated diene-based elastomer which a cis 1,4-polyisoprene rubber, followed by
   (C) blending said first rubber composition with said second rubber composition;

wherein said EPDM rubber is provided as a combination of:
(1) a first EPDM rubber as an ethylene/propylene/non-conjugated diene terpolymer having an ethylene/propylene ratio in a range of from about 35/65 up to 65/35, and having an ethylene content of from 35 up to 65 weight percent, and a non-conjugated diene content in a range of about 4 to about 12 weight percent, and
(2) a second EPDM elastomer as an ethylene/propylene/non-conjugated diene terpolymer having an ethylene/propylene ratio in a range of from at least 65/35 to about 85/15, and having an ethylene content in a range of from greater than 65 and up to about 85 weight percent, and a non-conjugated diene content in a range of about 2 to about 8 weight percent;

wherein said particulate reinforcing filler is comprised of at least one of rubber reinforcing carbon black, precipitated silica and exfoliated clay platelets;

wherein the weight ratio of said first EPDM to said second EPDM is in a range of from about 10/90 to about 90/10, and, wherein said non-conjugated diene for said EPDM is selected from ethylidene norbornene, dicyclopentadiene and trans 1,4-hexadiene.

* * * * *